April 6, 1926.

F. L. McQUISTON

WATER MOTOR

Filed Feb. 26, 1924

INVENTOR
FRANK L. MC.QUISTON
BY Munn & Co.
ATTORNEYS

April 6, 1926.
F. L. McQUISTON
1,579,723
WATER MOTOR
Filed Feb. 26, 1924    3 Sheets-Sheet 3
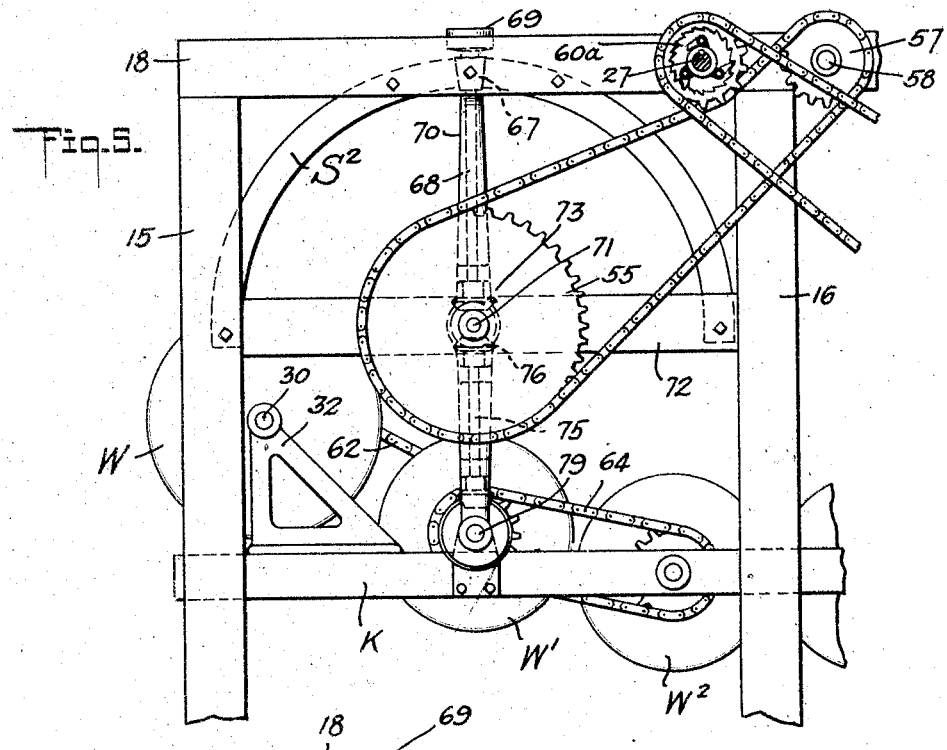
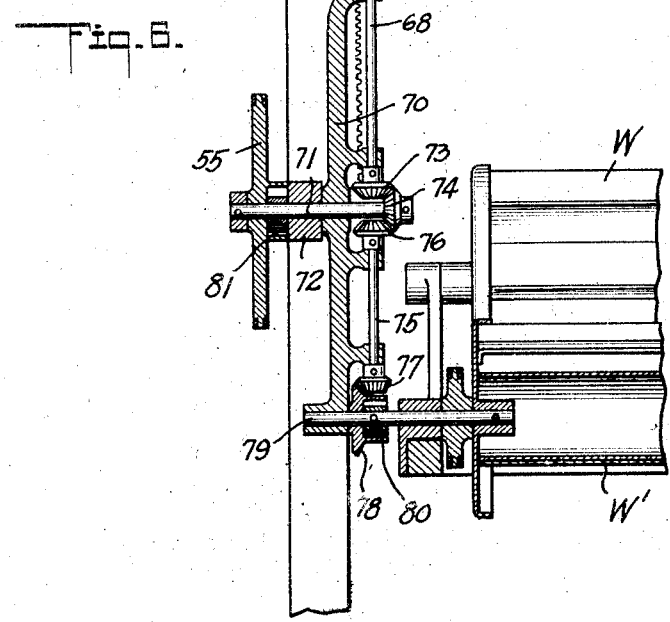
INVENTOR
FRANK L. MC.QUISTON
BY Munn & Co.
ATTORNEYS Patented Apr. 6, 1926.

1,579,723

UNITED STATES PATENT OFFICE.

FRANK L. McQUISTON, OF REDONDO BEACH, CALIFORNIA.

WATER MOTOR.

Application filed February 26, 1924. Serial No. 695,334.

*To all whom it may concern:*

Be it known that I, FRANK L. McQUISTON, a citizen of the United States, and a resident of Redondo Beach, in the county of Los Angeles and State of California, have invented certain new and useful Improvements in Water Motors, of which the following is a specification.

My invention relates generally to fluid current motors, and particularly to water motors, and a purpose of my invention is the provision of a water motor adapted to be sustained in submerged position in a body of water and operating to convert the movement of the water into power for performing useful work, and in such manner that the motor will be operated when the water moves in one direction and then the other, or continuously in one direction, and without the possibility of the motor being damaged as in storms.

It is also a purpose of my invention to provide a water motor which embodies a plurality of water wheels rotatable about their own axes and having water operated feathering blades, means for supporting the wheels for bodily oscillatory movement, and mechanism by which the rotary and oscillatory motions of the wheels can be converted into unidirectional rotary movement for actuating the shaft or other element.

It is also a purpose of my invention to provide a water motor which, in addition to having the desirable characteristics of structural simplicity, durablity and efficiency, is capable of being used in river streams and oceans, and which, in this latter use, is not subjected to the destructive action of the surf but still utilizes the motion of the water in effecting its operation.

I will describe only two forms of water motors embodying my invention, and will then point out the novel features thereof in claims.

In the accompanying drawings

Figure 4 is a vertical sectional view taken on the line 4—4 of Figure 1;

Figure 5 is a fragmentary view showing in side elevation another form of water motor embodied in my invention;

Figure 6 is a fragmentary vertical sectional view of the motor shown in Figure 5.

Similar reference characters refer to similar parts in each of the several views of the drawings.

Figure 1:
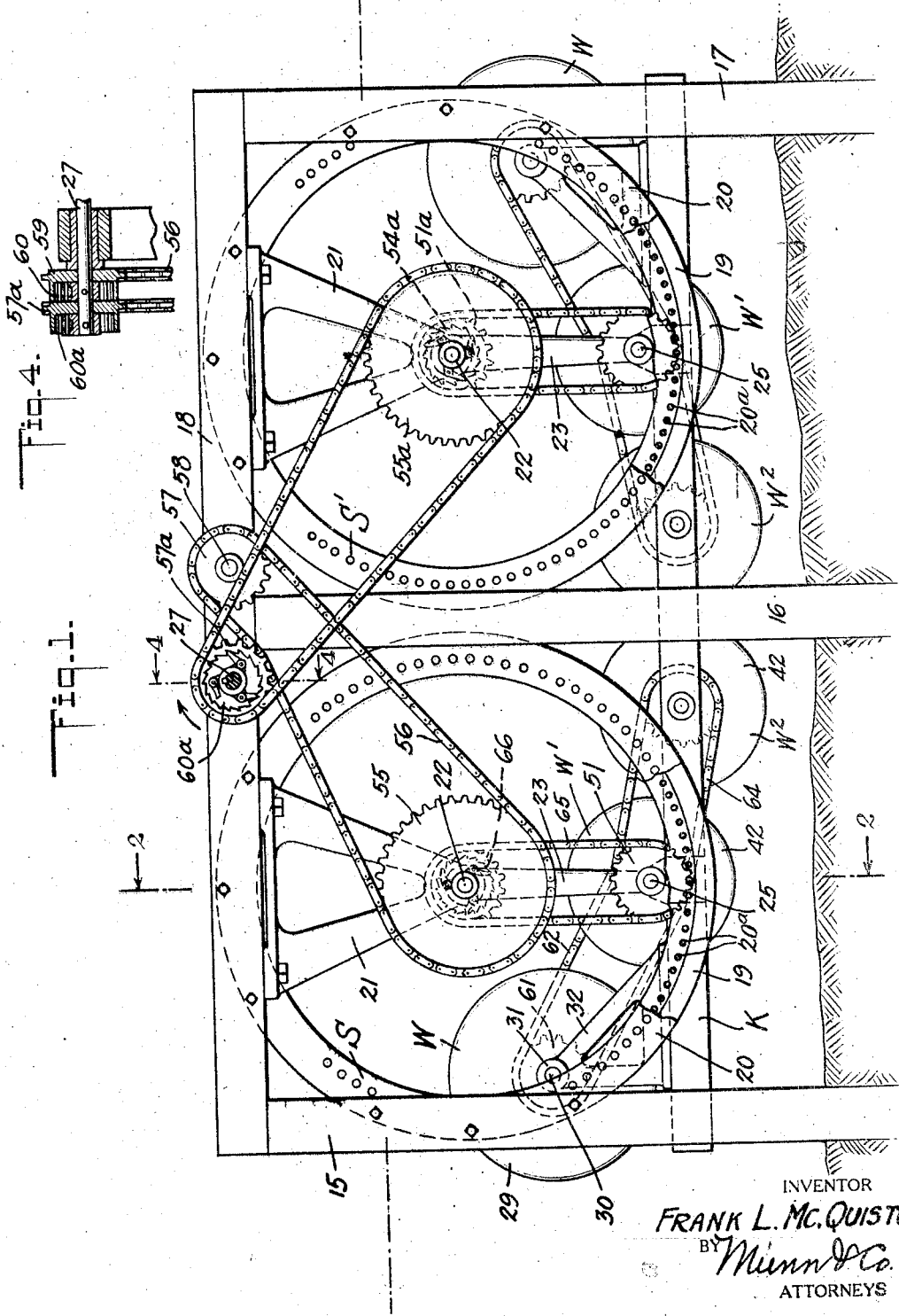
Figure 1 is a view showing in side elevation, with portions thereof broken away, one form of water motor embodying my invention.
Figure 2:
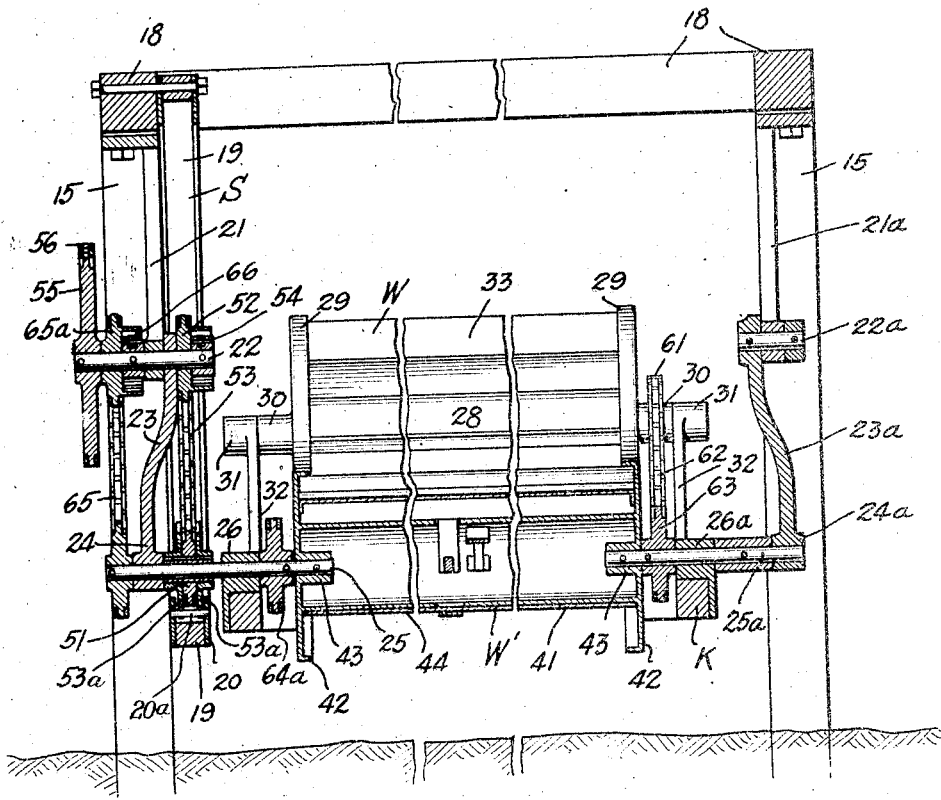
Figure 2 is a vertical sectional view taken on the line 2—2 of Figure 1.
Figure 3:
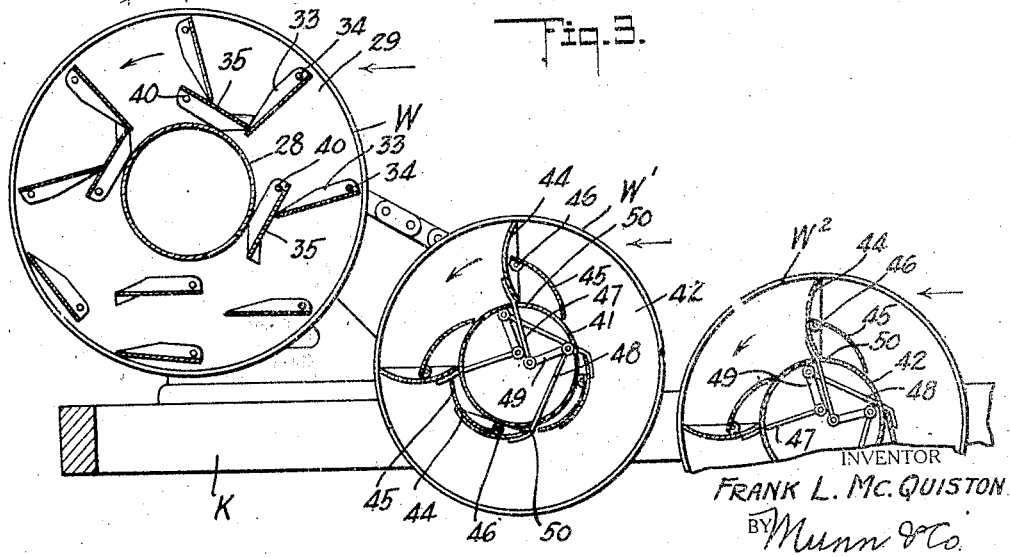
Figure 3 is an enlarged vertical sectional view of one set of water wheels embodied in the motor shown in the preceding views.

Referring specifically to the drawings, and particularly to Figures 1, 2 and 3, my invention in its present embodiment comprises a stationary frame made up of vertical beams 15, 16 and 17, and horizontal beams 18, the frame being of substantially rectangular form and with the vertical beams adapted to be embedded in the bottom of the body of water in which it is adapted to operate and serving as a support for the entire motor. Sector gears S and S' are suitably secured to the frame and at opposite sides of the central vertical beam 16. These sector gears are made up of annuli 19 having metal flanges 20, in which are secured relatively short rods $20^a$ constituting teeth. It is to be understood that the sector gears may be constructed in any manner desired so long as the teeth thereof are disposed upon the inner periphery of the annuli in order to permit the arrangement of gears within the annuli and in meshing relation with the teeth.

A carriage designated generally at K is supported for swinging movement upon the frame by means of hangers 21 and $21^a$ (Figure 2) secured to and depending from the horizontal beams 18 and arranged in pairs, with the hangers of each pair receiving shafts 22 and $22^a$. Movable hangers 23 and $23^a$ are mounted on the shafts 22, and these hangers are provided with bearings 24 and $24^a$ which receive shafts 25 and $25^a$. The shafts 25 and $25^a$ are also journaled in bearings 26 and $26^a$ secured to the carriage K.

By this arrangement it will be seen that the hangers 23 and $23^a$ are pivotally sustained upon the hangers 21 and $21^a$, and that the latter, through the shafts 25 and $25^a$ serve to support the carriage K for pivotal movement about the shafts 22 and 22ª as a center. It will be understood that one pair of hangers 21 and 21ª and 23 and 23ª are arranged at opposite sides of the vertical beams 16 and for the purpose of supporting the carriage K in such manner that it normally occupies a horizontal position as shown in Figure 1.

Suitably journaled in the beams 18 of the frame is a shaft 27 which constitutes the driven member of the motor from which power is adapted to be taken for performing useful work. This shaft is adapted to be continuously rotated in the same direction, and in the present instance I have shown two separate water wheel units operatively connected to the shaft 27 and operating together to drive the shaft when the motor is used in a body of water in which the undercurrent flows in first one direction and then the other or continuously in one direction. In the present instance I have shown two water wheel units which are identical in construction, with the exception of certain parts of the mechanisms for transmitting the motions of the wheels to the shaft 27.

One water wheel unit comprises an upper water wheel W, an intermediate water wheel W' and a lower wheel W². As clearly shown in Figs. 1 and 2, these three wheels are arranged at different levels upon the carriage K and are wholly supported by the carriage K so as to move with the latter. As shown in Figure 3, the wheel W comprises a cylindrical body 28, the ends of which are secured to flanged disks 29. Stub shafts 30 are fixed to the disks 29 and are journaled in bearings 31 formed on brackets 32 secured to the carriage K. Blades 33 are pivoted at the points indicated at 34 to the disks 29 so as to be free to occupy active or inactive positions with respect to a body of moving water or what is commonly known as feathering. Subsidiary blades 35 are pivoted to the disks 29 at the points indicated at 40, and these blades are adapted to be engaged by the blades 33, whereby the latter are sustained for the proper interval in active position so as to oppose movement of the water and thus set up rotation of the wheel as a unit. In the active position of the blades 35 they engage the lower edge of one blade 33 and the inner face of an adjacent blade 33, thereby holding the two blades against movement to a horizontal position in order that the force of the moving water may act upon the blades and thus set up rotation of the wheel. However, as the wheel rotates the movement of the water upon the opposite sides of the blades 33 allows them to swing free of the subsidiary blades 35 so that their edges are presented to the moving water and thus occupying what I have termed as the inactive position.

The wheels W' and W² are identical in construction so that a description of one will suffice for both. The wheel W' comprises a cylindrical body 41, to the ends of which are secured flanged disks 42, and the shafts 25 and 25ª are journaled in bearings 43 carried by the disks 42. Blades 44, preferably of concave form, are mounted upon the body to occupy active or inactive positions, and curved deflecting plates 45 are pivoted to the blades at the points 46 for directing moving water against the outer marginal edges of the blades 44 so as to secure the greatest possible leverage, as will be understood. These blades 44 are connected in pairs by arms 47 and 48 secured to the blades of any one pair and pivotally connected to each other by means of a link 49. The arms 48 are fixedly secured to the inner edges of the blades 44 and extend into the body 41 through openings 50, their inner ends being operatively connected to each other through the link 49. The association of the arms and link is such that when one blade 44 is in active position, the corresponding blade 44 is in inactive position, and when the active blade is moved to inactive position the inactive blade is moved to active position. In the active position of either blade it is disposed radially with respect to the body 41 of the deflecting plate 45 occupying what may be termed a tangential position with respect to the body 41 so that water impinging thereagainst will be directed to the marginal edge of the blade 44. In the inactive position of either blade 44 it is folded against the body 41 so as to offer the least possible resistance to the movement of the water, the deflecting plate being also folded and interposed between the blade 44 and the body.

A water wheel constructed in this manner is practically indestructible and cannot be damaged by rocks or other solid matter traversing a body of water in which the motor is operating because the body 41 is rounded and will therefore deflect solid matter to either side of the body, while the blades when in inactive position are folded up against the cylindrical body and, being of approximately the same curvature, will function in the same manner with respect to solid matter as the body. Furthermore, the blades, when in active position, are free to move with the wheel so as to respond to any moving solid matter.

The driving of one shaft 22 clockwise and the other counterwise, is necessary in order that the oscillatory movements of the carriages may be transmitted to the common shaft 27. The utility of arranging the wheels at various levels is to permit the moving water to act directly on each wheel, and should the undercurrent of the water be greater than the surface current, those wheels near the bottom will be in the path of the undercurrent so as to be actuated thereby. Resultantly, by arranging the wheels at various levels any current existing in a body of water will be intercepted by the wheels in contradistinction to arranging the wheels at one and the same level.

From the preceding description of the water wheels of one set it will be clear that because of the feathering action of the blades, the wheels of the left hand unit shown in Figure 3 can rotate in a counterclockwise direction only irrespective of the direction of flow of water past the wheels. The blades of the wheels of the right hand unit are reversed with respect to those of the left hand unit so that irrespective of the direction of water flow, the wheel can be rotated in a clockwise direction only.

As previously described, the water wheels of both sets are mounted upon the carriage K and are thus capable of bodily movement in addition to being rotatable about their own axes. As the carriage K is free to swing, it will be clear that under the action of a moving body of water the wheels, in addition to being rotated, will also serve to swing the carriage in the direction of movement of the body of water. To utilize this movement of the carriage in effecting a propulsion of the shaft 27, I have provided the following mechanism: This mechanism includes the sector gear S or S' and sprocket wheels 51 and 52 connected by a chain 53. The sprocket wheel 51 rotates freely on the shaft 25 but is fixed to companion sprocket wheels 53ª which at all times mesh with the teeth 21 of the sector gears. The sprocket wheel 52 rotates freely on the shaft 22 but is adapted to be operatively connected to such shaft when rotated in one direction only through the medium of a pawl and ratchet 54. Keyed to the outer end of the shaft 22 is a relatively large sprocket wheel 55 about which is trained a chain 56 for operatively connecting the latter to a smaller sprocket wheel 57 mounted on a shaft 58. The upper stretch of the chain 56 is adapted to have engagement with a sprocket wheel 59 (Figure 4) which rotates freely on the shaft 27, but is adapted to be operatively connected thereto by a ratchet device 60 and in such manner that when the wheel 59 is rotated in a clockwise direction, as when viewed in Figure 1, the wheel will operate to rotate the shaft 27.

As the sprocket wheel 51 constantly meshes with the teeth 21, and the sector gear is stationary on the frame, it will be manifest that when the carriage K is swung in either direction rotation of the sprocket wheel will be effected. However, the driving of the sprocket wheel in one direction only is utilized to propel the shaft 27 through the medium of the ratchet device 54 and 60. As at present designed, the rotation of the sprocket wheel 51 in a counterclockwise direction as when viewed in Figure 1, is utilized to effect propulsion of the shaft 27. When the sprocket wheel rotates in the opposite direction, the ratchet devices are ineffective to transmit motion from one element to the other so that no operative connection is provided between the sprocket wheel and the shaft 27.

The corresponding elements of the mechanism for transmitting the motion of the carriage K to the shaft 27 have been designated by like reference numerals having exponents to distinguish such elements from those of the first mechanism. The two mechanisms are the same with the exception that the ratchet device 54ª only connects the sprocket wheel 51ª and the sprocket wheel 55ª when the former is rotated in a clockwise direction. Further, the sprocket wheel 57ª is adapted to be operatively connected to the shaft 27 through the ratchet device 60ª only, when the sprocket wheel is rotating in a clockwise direction.

From the foregoing operation of the two mechanisms, it will be clear that when the carriage K swings to the left, as when viewed in Figure 1, its motion will operate to drive the sprocket wheel 51ª, and that the rotational movement of the sprocket wheel is transmitted to the shaft 27. When the carriage K swings in the opposite direction, the sprocket wheel 51 is rotated in a counterclockwise direction and such motion is reversed in its transmission to the shaft 27 to rotate the latter in a clockwise direction. It will therefore be seen that according as the carriage swings in one direction or the other the sprocket wheels 51 and 51ª will operate to rotate the shaft 27 in a clockwise direction only.

The mechanisms for transmitting the rotary motions of the two sets of water wheels are identical so that a description of one will suffice. As shown in Figure 2, one of the stub shafts 30 has fixed thereto a sprocket wheel 61 about which is trained an endless chain 62. The chain 62 embraces a sprocket wheel 63 keyed to the shaft 25ª so that the rotational movement of the wheel W is transmitted to the wheel W'. The rotary movement of the wheel W² is transmitted to the wheel W through a similar chain and sprocket connection designated generally at 64, the upper sprocket 64ª of which is keyed to the shaft 25. Rotary movement of the wheel W' is transmitted to the shaft 25 and from the latter to the shaft 22 through a chain and sprocket connection 65. The upper sprocket 65ª of this connection rotates freely on the shaft 22 in one direction, but is adapted to be locked thereto through a ratchet device 66 when rotated in the opposite direction. In this manner the rotational movement of the several wheels is transmitted to the shaft 22.

From the foregoing description of the mechanism for the wheels of one water unit, it will be evident that although the two water wheel units are adapted to rotate in different directions, their motions are transmitted to the shaft 27 in a manner to effect unidirectional rotation thereof at all times.

In practice, where a body of water is moving first in one direction and then the other, the right hand water wheel unit, as when viewed in Figure 1, is rotated in a clockwise direction by virtue of the fact that only the water moving below the axes of the wheels is acting on the wheel blades to propel the wheels, while in one direction of flow at the same time in the instance of the left hand water wheel unit, the water moving above the axes of the wheels is acting on the blades to propel the wheels of such unit in a counter-clockwise direction. Upon the reverse direction of flow only the water moving above the axes, in the case of the right hand wheels, and below the axes in the case of the left hand wheels, is operative, the wheels continuing to operate in the same direction as before. Simultaneously with the rotation of the two water wheels units, the carriage under the reverse action of the water currents is set into oscillatory movement to rotate the sprocket wheels 51 and 51$^a$ first in one direction and then the other. However, by virtue of the ratchet devices 54 only those motions which will effect unidirectional rotative movement of the shaft 27 in a clockwise direction are transmitted to the shaft.

Should the wheels of one water wheel unit rotate at a greater speed than those of the other unit, only the motion of that unit propelled at the greatest speed is transmitted to the shaft 27, while the slower unit is allowed to idle. The slower unit is disconnected from the corresponding shaft 22 through the ratchet device 66, because of the fact that the shaft 22 which remains operatively connected to the shaft 27 through the sprocket 55 is rotated at a speed greater than the speed of rotation of the corresponding sprocket 65$^a$. In a like manner the ratchet devices 55 operate to transmit the power generated by the oscillating carriage only when the sprockets 51 are rotated at a speed equal to or greater than the rotation of speed of the shafts 22.

From the foregoing operation it will be manifest that only the motion of that unit of water wheels or that pair of sprockets 51 having the greatest rotational speed is transmitted to the driven shaft 27, thus preventing the other unit or pair of sprockets from opposing the driving force transmitted to the shaft. Further, should the rotational speed of both wheel units be equal, or one pair of sprockets and one or both wheel units equal, they will operate together in driving the shaft 27.

When the motor is used in a body or water in which the movement of the water is in one direction only, the carriage K will be swung to one of its extreme positions and maintained in such position, with the wheels W, W′ and W² rotating and the mechanisms transmitting the rotary motions of these wheels to the shaft 27.

In any use of the water motor it is completely submerged with the exception of the shafts 27 and 58 and the adjacent mechanism, the water wheels and carriage being completely submerged and to a depth sufficient to prevent them from being subjected to the destructive actions of the surf, yet positioned to respond to the undercurrents and thus convert the power generated by such undercurrents into useful work. The power generated by the motor is taken from the shaft 27, as will be understood.

Referring now to Figures 5 and 6, I have here shown another form of water motor embodying my invention, which is identical to the first form, with the following exceptions: Instead of placing the sector gears S and S′ below the pivotal points of the carriage K as in the first form, the sector gears designated at S² are arranged above the pivotal points of the carriage. These sector gears S² in the present instance are of semi-circular form, and constantly meshing with each sector gear is a beveled pinion 67 loosely mounted on a shaft 68 and adapted to be fixed to the shaft through a ratchet device 69, when the shaft rotates in a predetermined direction. The shaft 68 is journaled in bearings formed on a lever 70 fulcrumed in a shaft 71 journaled in a stationary beam 72. The lower end of the shaft 70 is provided with a beveled pinion 73 meshing with a similar pinion 74 fixed to the inner end of the shaft 71. The lever 70 is provided with other bearings in which a shaft 75 is journaled, the upper end of the shaft being provided with a pinion 76 meshing with the pinion 74. The lower end of the shaft 75 is provided with a pinion 77 meshing with a pinion 78 adapted to be secured to a shaft 79 through a ratchet device 80 when the shaft is rotated in a predetermined direction. This shaft 79 corresponds to one of the shafts 25 in the first form of my invention and is adapted to be rotated by the water wheels W, W′ and W². The shaft 71 corresponds to one of the shafts 22 in the first form of my invention and carries at its outer end a sprocket wheel 55 which is adapted to be secured thereto through a ratchet device 81 when the shaft 71 is rotated in a predetermined direction.

From the foregoing construction it will be clear that oscillatory movement of the carriage K will rock the lever 70 about the shaft 71 as a center, thereby moving the pinion 67 over the sector gear S². Under this action the gear 67 is rotated and when rotating in a predetermined direction operates the shaft 68, which latter in turn operates the shaft 71 which will rotate the sprocket wheel 55. The motion of the water wheels is transmitted to the sprocket 55 through the shafts 75 and 71, as will be understood.

Although I have herein shown and described only two forms of water motor embodying my invention, it is to be understood that various changes and modifications may be made herein without departing from the spirit of the invention and the spirit and scope of the appended claims.

What is claimed is:

1. In a water motor, a stationary frame, a carriage mounted for oscillatory movement on the frame, and a plurality of water wheels arranged at various levels on the carriage.

2. In a water motor, a stationary frame, a carriage mounted for oscillatory movement in the frame, a water wheel on the carriage, a sector gear fixed to the frame, a gear mounted on the carriage and meshing with the sector gear, so that when the carriage is moved the gear is rotated, a shaft mounted on the frame, and means for transmitting the motions of the gear and wheel to said shaft so as to rotate the latter in one direction only.

3. In a water motor, a stationary frame, a carriage mounted for oscillatory movement on the frame, a plurality of water wheels arranged at various levels on the carriage, a sector gear fixed to the frame, a gear mounted on the carriage and meshing with the sector gear so that when the carriage is moved the gear is rotated, a shaft mounted on the frame, and means for transmitting the motions of the gear and wheel to said shaft so as to rotate the latter in one direction only.

4. A water motor comprising water wheels arranged in sets, means for supporting the wheels of both sets for rotary movement about their own axes and bodily oscillatory movement about a common axis, a rotatable member, and means operating to convert the oscillatory motion of the wheels of both sets into rotary motion and transmit the motion to the rotatable member in such manner that when the wheels move bodily in one direction and then the other the rotary and oscillatory motions of one set and then the other will be transmitted to the rotatable member to rotate the latter in one direction only.

5. A water motor as embodied in claim 4, wherein the wheels of each set are disposed at different levels, with respect to each other, but at corresponding levels with respect to the wheels of the other set.

6. A water motor comprising a stationary frame, a carriage sustained for oscillatory movement on the frame, sector gears fixed to the frame, gears mounted on the carriage and meshing with the sector gears so that when the carriage is moved the gears are rotated, a shaft mounted on the frame, and means for transmitting the motions of the gears to said shafts so as to rotate the latter in one direction only.

7. A water motor comprising a stationary frame, a carriage sustained for oscillatory movement on the frame, sector gears fixed to the frame, gears mounted on the carriage and meshing with the sector gears so that when the carriage is moved the gears are rotated, a shaft mounted on the frame, means for transmitting the motions of the gears to said shafts so as to rotate the latter in one direction only, comprising a pair of shafts, sprocket connections between said gears and shafts, ratchet devices associated with said connections for transmitting motion to said shafts in predetermined directions, a counter-shaft mounted in the frame, a chain and sprocket connection between one of said shafts and the first shaft, a ratchet device associated with said chain and sprocket connection for transmitting motion thereof to said shaft in one direction only, a chain and sprocket connection between the other of said shafts and the counter-shaft, a sprocket on the first shaft engaging the chain of the last chain and sprocket connection, and a ratchet device for operatively connecting the said sprocket to the first shaft to transmit motion thereof to said shaft in one direction only.

8. In a water motor, a stationary frame, a carriage mounted for oscillatory movement in the frame, a water wheel rotatable on the carriage, movable means on the carriage and stationary means on the frame coacting to rotate the movable means when the carriage is oscillated, a shaft, and means for transmitting the motion of said wheel and movable means to said shaft so as to rotate the latter in one direction only.

9. In a water motor, a stationary frame, a carriage mounted for oscillatory movement in the frame, a plurality of water wheels arranged at various levels on the carriage, movable means on the carriage and stationary means on the frame coacting to rotate the movable means when the carriage is oscillated, a shaft, and means for transmitting the motion of said wheels and movable means to said shaft so as to rotate the latter in one direction only.

10. A water motor comprising a stationary frame, a carriage sustained for oscillatory movement on the frame, water wheels rotatable on the carriage and movable bodily to oscillate the carriage, a shaft, and means for transmitting the movements of the wheels and carriage to the shaft to rotate the latter in one direction only.

11. A water motor as embodied in claim 7, in which water wheels are mounted upon the carriage and arranged in sets, with the wheels of each set operatively connected to each other and to said shafts, and ratchet devices for transmitting the motion of the water wheels to said shafts in one direction only for one set of wheels and in the other direction for the other set of wheels.

FRANK L. McQUISTON.